US00RE38135E

(19) United States
(12) Reissued Patent
Stolpmann et al.

(10) Patent Number: US RE38,135 E
(45) Date of Reissued Patent: Jun. 10, 2003

(54) MATTRESS STRUCTURE HAVING A FOAM MATTRESS CORE

(75) Inventors: James R. Stolpmann, Charleston, SC (US); Gary W. Ferdon, Charleston, SC (US); Roger D. Dalton, Monsks Corner, SC (US)

(73) Assignee: Hill-Rom Services, Inc., Batesville, IN (US)

(21) Appl. No.: 09/656,791

(22) Filed: Sep. 7, 2000

Related U.S. Patent Documents

Reissue of:
(64) Patent No.: 5,802,646
Issued: Sep. 8, 1998
Appl. No.: 08/653,416
Filed: May 24, 1996

U.S. Applications:
(63) Continuation-in-part of application No. 08/565,709, filed on Nov. 30, 1995, now Pat. No. 5,669,757.

(51) Int. Cl.[7] ..... A47C 27/15
(52) U.S. Cl. ..... 5/740; 5/737; 5/739; 5/730
(58) Field of Search ..... 5/722, 729, 727, 5/731, 737, 738, 739, 740, 926

(56) References Cited

U.S. PATENT DOCUMENTS

| | | | | | |
|---|---|---|---|---|---|
| 595,734 | A | * | 12/1897 | Rand et al. | 5/710 |
| 2,245,909 | A | * | 6/1941 | Enfiajian | 128/DIG. 20 |
| 2,651,788 | A | * | 9/1953 | Forwood | 5/1 |
| 3,080,578 | A | * | 3/1963 | Novascone | 5/717 |

(List continued on next page.)

FOREIGN PATENT DOCUMENTS

| | | | |
|---|---|---|---|
| CH | 678-390 | * | 9/1991 |
| DE | 1114015 | * | 9/1961 |
| EP | 0 360 733 | * | 3/1990 |
| GB | 122806 | * | 2/1919 |

OTHER PUBLICATIONS

"Introducing a revolutionary way to improve your sleep" Select Comfort Corp. adevertising literature 1996.*

"Select Comfort Adjustable Firmness Sleep Systems" Select Comfort Corp. advertising literature, date unknown.*

Anatomic Concepts, Inc., Conforma II promotional literature, 5 pages, prior art.

LTC Market Research, Clinical Results of Anatomic Mattresses, 1993, 4 pages, prior art.

Anatomic Concepts, Inc., Naturesleep 500 promotional literature, 2 pages, prior art.

Anatomic Concepts, Inc., Conforma 9000 promotional literature, 12 pages, prior art.

Ostomy—Wood Management, HMP Communications, LLC, Dec. 1994, p. 82, prior art.

*Primary Examiner*—Michael F. Trettel
(74) *Attorney, Agent, or Firm*—Barnes & Thornburg

(57) ABSTRACT

An elongated mattress core for a mattress structure includes a foam core having an upwardly-facing top surface, a bottom surface spaced apart from the top surface, and first and second elongated sides connecting the top and bottom surfaces. The foam core is formed to include a plurality of longitudinally spaced apart transverse slits extending downwardly from the top surface. Each slit terminates at a lower end spaced apart from the bottom surface by a first distance and extending transversely from a first slit end spaced apart from the first side of the foam core to a second slit end spaced apart from the second side of the foam core. Each adjacent pair of slits defines a foam column so that the foam core has a plurality of longitudinally spaced apart and transversely extending foam columns. Each foam column has a pair of generally vertical column side walls defining the slits. Each column side wall includes a shear coating having a low coefficient of friction so that each column can compress and decompress without drag forces resulting from frictional engagement with adjacent column side walls interfering with the compression and decompression.

41 Claims, 5 Drawing Sheets

U.S. PATENT DOCUMENTS 3,080,720 A * 3/1963 Downs et al. ..... 200/81 H
3,138,807 A * 6/1964 Blecker ..... 5/248
3,574,873 A 4/1971 Weinstein
3,595,223 A * 7/1971 Castagna ..... 5/713
3,731,327 A * 5/1973 Frey ..... 5/411
3,848,282 A * 11/1974 Viesturs ..... 5/665
3,974,532 A * 8/1976 Ecchuya ..... 5/636
4,180,877 A * 1/1980 Higgins ..... 5/263
4,306,322 A * 12/1981 Young et al. ..... 297/284.1
4,336,621 A * 6/1982 Schwartz et al. ..... 5/411
4,424,600 A * 1/1984 Callaway ..... 5/485
4,435,864 A * 3/1984 Callaway ..... 5/400
4,440,817 A * 4/1984 Ahlm ..... 428/316.6
4,449,261 A * 5/1984 Magnusson ..... 5/706
4,539,057 A * 9/1985 Ahlm ..... 5/737
4,580,301 A * 4/1986 Ludman et al. ..... 5/724
4,622,706 A * 11/1986 Takeuchi ..... 5/713
4,628,557 A * 12/1986 Murphy ..... 5/699
4,634,179 A * 1/1987 Hashimoto et al. ..... 297/284.3
4,638,519 A * 1/1987 Hess ..... 5/53.3
4,694,520 A * 9/1987 Paul et al. ..... 340/540
4,706,313 A * 11/1987 Murphy ..... 5/722
4,745,647 A * 5/1988 Goodwin ..... 5/618
4,768,249 A * 9/1988 Goodwin ..... 5/713
4,803,744 A * 2/1989 Peck et al. ..... 5/706
4,829,615 A * 5/1989 Raymond ..... 5/505.1
4,829,616 A * 5/1989 Walker ..... 200/83 Q
4,834,666 A * 5/1989 Lee ..... 439/147
4,862,538 A * 9/1989 Spann et al. ..... 5/730
4,879,776 A * 11/1989 Farley ..... 5/430
4,890,344 A * 1/1990 Walker ..... 200/83 Q
4,896,389 A * 1/1990 Chamberland ..... 5/710
4,897,890 A * 2/1990 Walker ..... 137/596
4,908,895 A * 3/1990 Walker ..... 5/706
4,935,968 A * 6/1990 Hunt et al. ..... 5/713
4,949,413 A 8/1990 Goodwin
4,949,414 A * 8/1990 Thomas et al. ..... 5/611
4,951,335 A * 8/1990 Eady ..... 5/709
4,955,095 A * 9/1990 Gerrick ..... 5/691
D313,973 S * 1/1991 Walker ..... D13/168
4,982,466 A * 1/1991 Higgins et al. ..... 5/713
4,986,738 A * 1/1991 Kawasaki et al. ..... 137/116.3
4,991,244 A * 2/1991 Walker ..... 5/400
4,998,310 A * 3/1991 Olson ..... 5/201
5,007,123 A * 4/1991 Salyards ..... 5/699
5,025,519 A * 6/1991 Spann et al. ..... 5/724
5,029,352 A * 7/1991 Hargest et al. ..... 5/689
5,038,433 A * 8/1991 Farley ..... 5/730
5,062,169 A * 11/1991 Kennedy et al. ..... 5/713
5,065,485 A * 11/1991 Zocco ..... 29/525.03
5,070,560 A * 12/1991 Wilkinson ..... 5/236.1
5,077,849 A * 1/1992 Farley ..... 5/727
5,081,728 A * 1/1992 Skinner ..... 5/411
5,083,332 A * 1/1992 Foster et al. ..... 5/181
5,101,527 A * 4/1992 WadsworthI et al. ..... 5/496
5,103,519 A * 4/1992 Hasty ..... 5/621
5,105,488 A * 4/1992 Hutchinson et al. ..... 5/614
5,111,542 A * 5/1992 Farley ..... 5/727
5,127,119 A * 7/1992 Rogers ..... 5/738 X
5,144,707 A * 9/1992 Callaway et al. ..... 5/678
5,170,522 A * 12/1992 Walker ..... 5/615
5,172,439 A * 12/1992 Farley ..... 5/722
5,178,811 A * 1/1993 Farley ..... 264/138
5,179,742 A * 1/1993 Oberle ..... 5/727
5,179,744 A * 1/1993 Foster et al. ..... 5/185
5,201,780 A * 4/1993 Dinsmoor, III et al. ..... 5/926
5,231,717 A * 8/1993 Scott et al. ..... 5/400
5,245,716 A * 9/1993 Callaway et al. ..... 5/679
5,259,079 A * 11/1993 Visser et al. ..... 5/685
5,267,364 A * 12/1993 Volk ..... 5/710
5,331,698 A * 7/1994 Newkirk et al. ..... 5/602
5,353,454 A * 10/1994 Callaway et al. ..... 5/665
5,367,728 A * 11/1994 Chang ..... 5/615
5,394,577 A * 3/1995 James et al. ..... 5/713
5,398,354 A * 3/1995 Balonick et al. ..... 5/28
5,428,852 A * 7/1995 Tenuta et al. ..... 5/690
5,524,307 A * 6/1996 Griffin ..... 5/236.1
5,561,873 A * 10/1996 Weedling ..... 5/703

* cited by examiner-

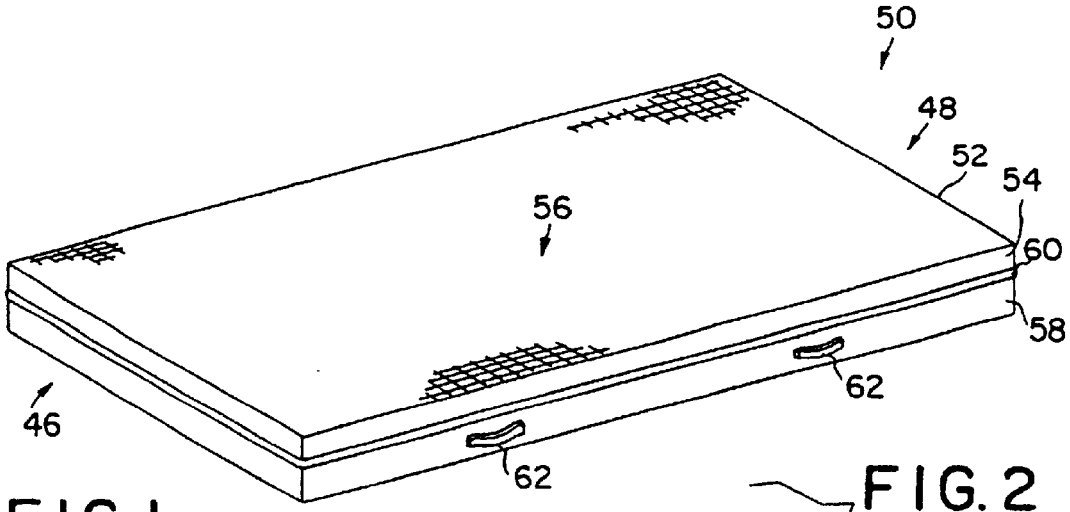
FIG. 1
FIG. 2
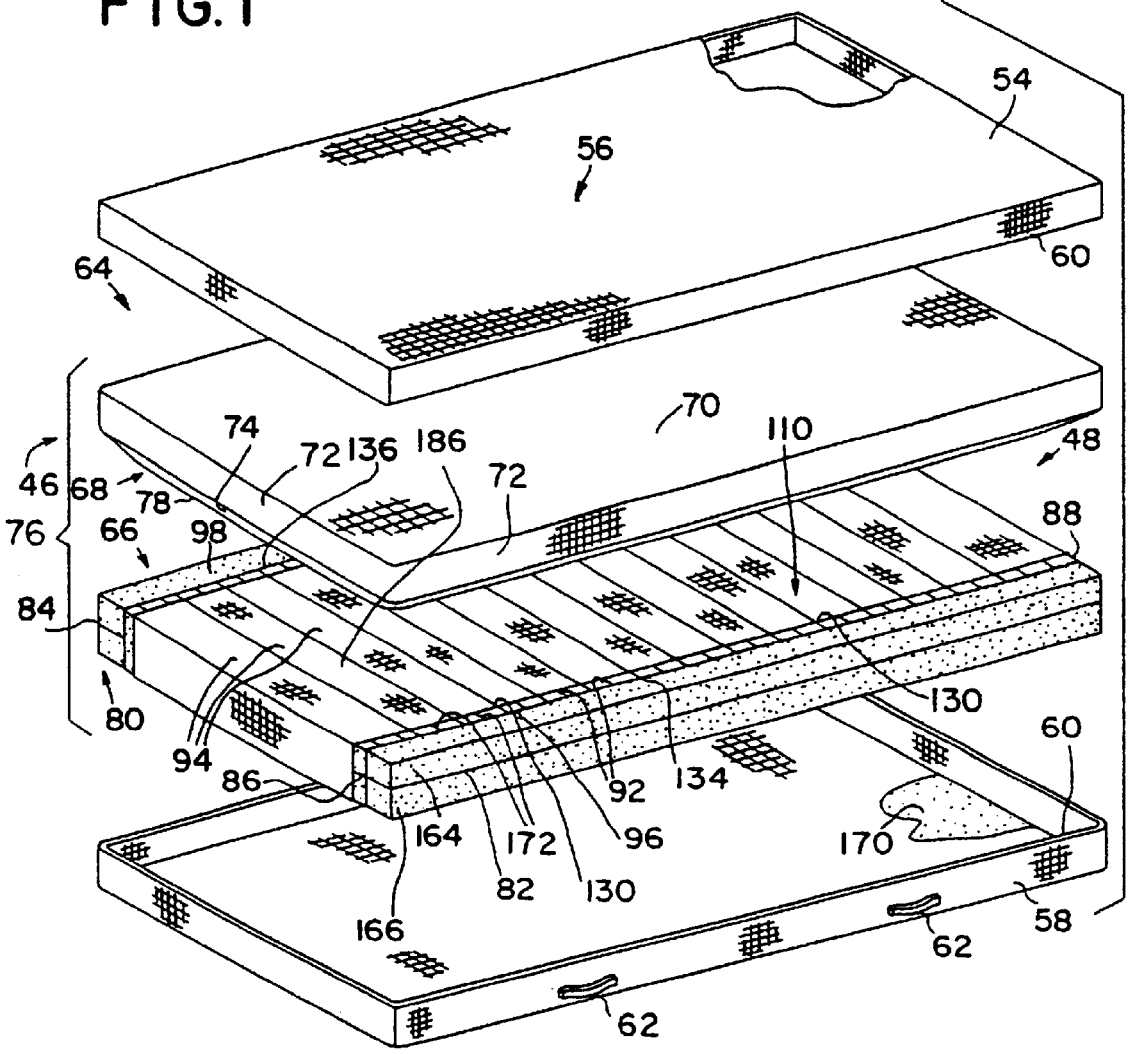

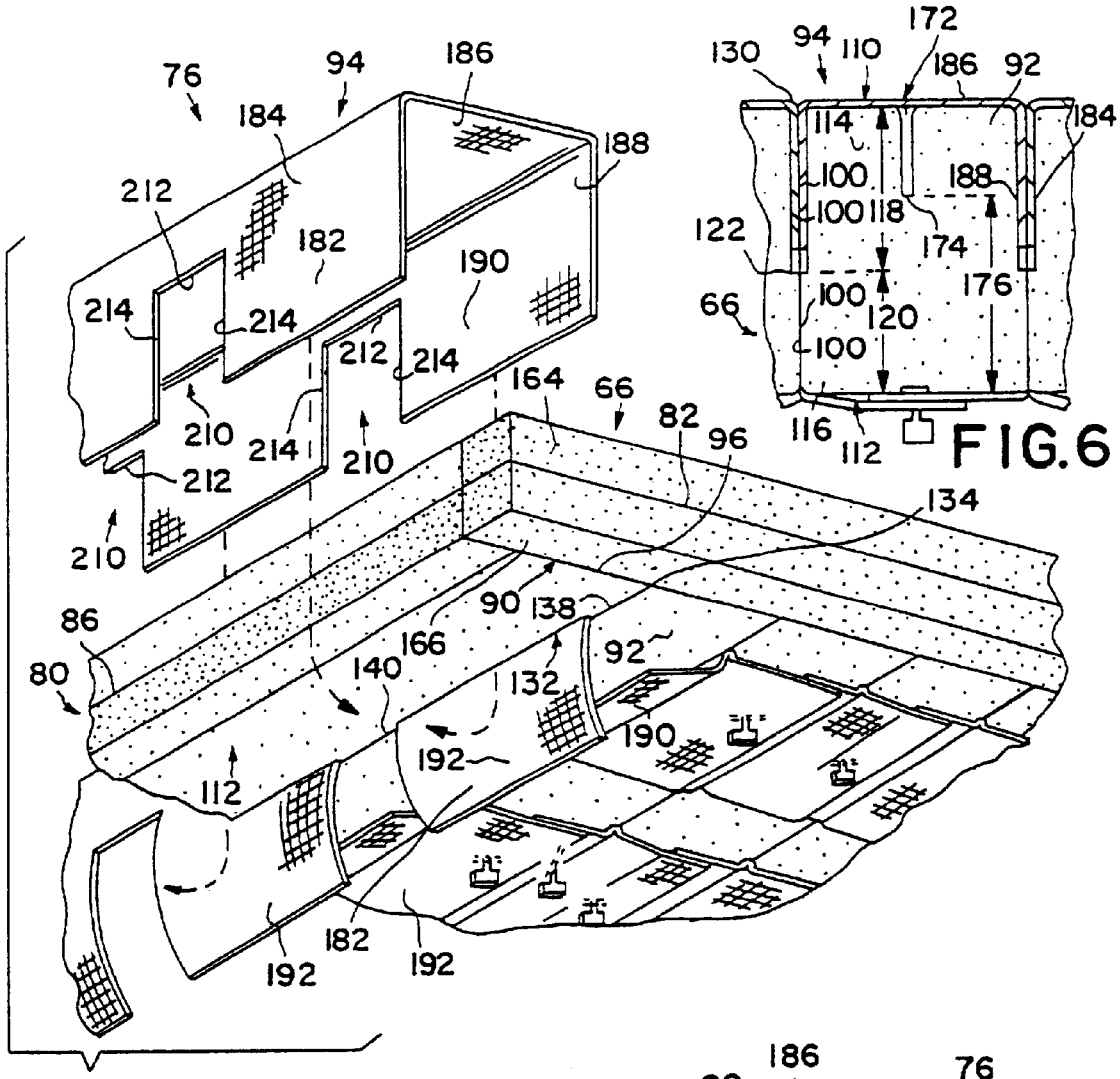
FIG. 5
FIG. 6
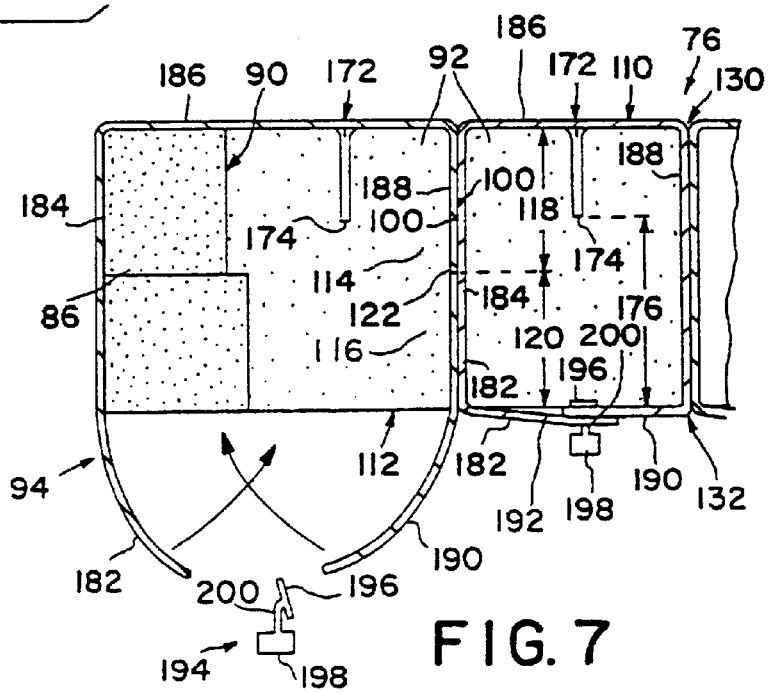
FIG. 7

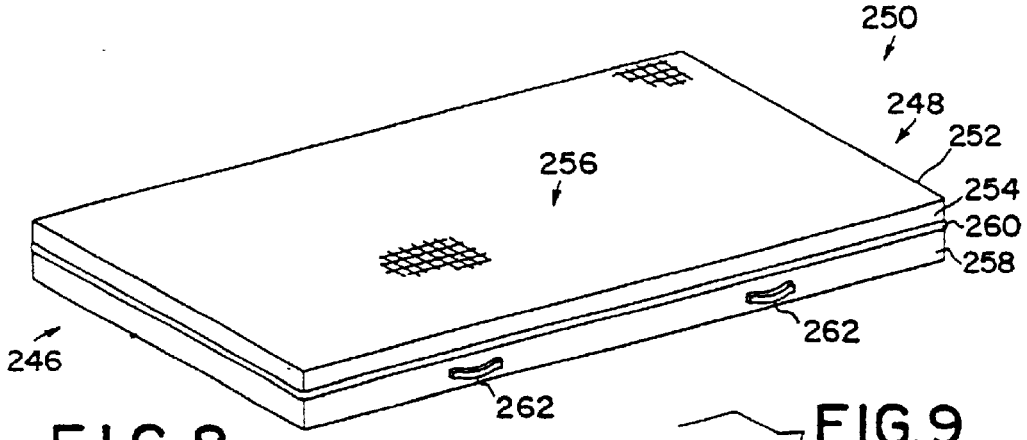
FIG. 8
FIG. 9
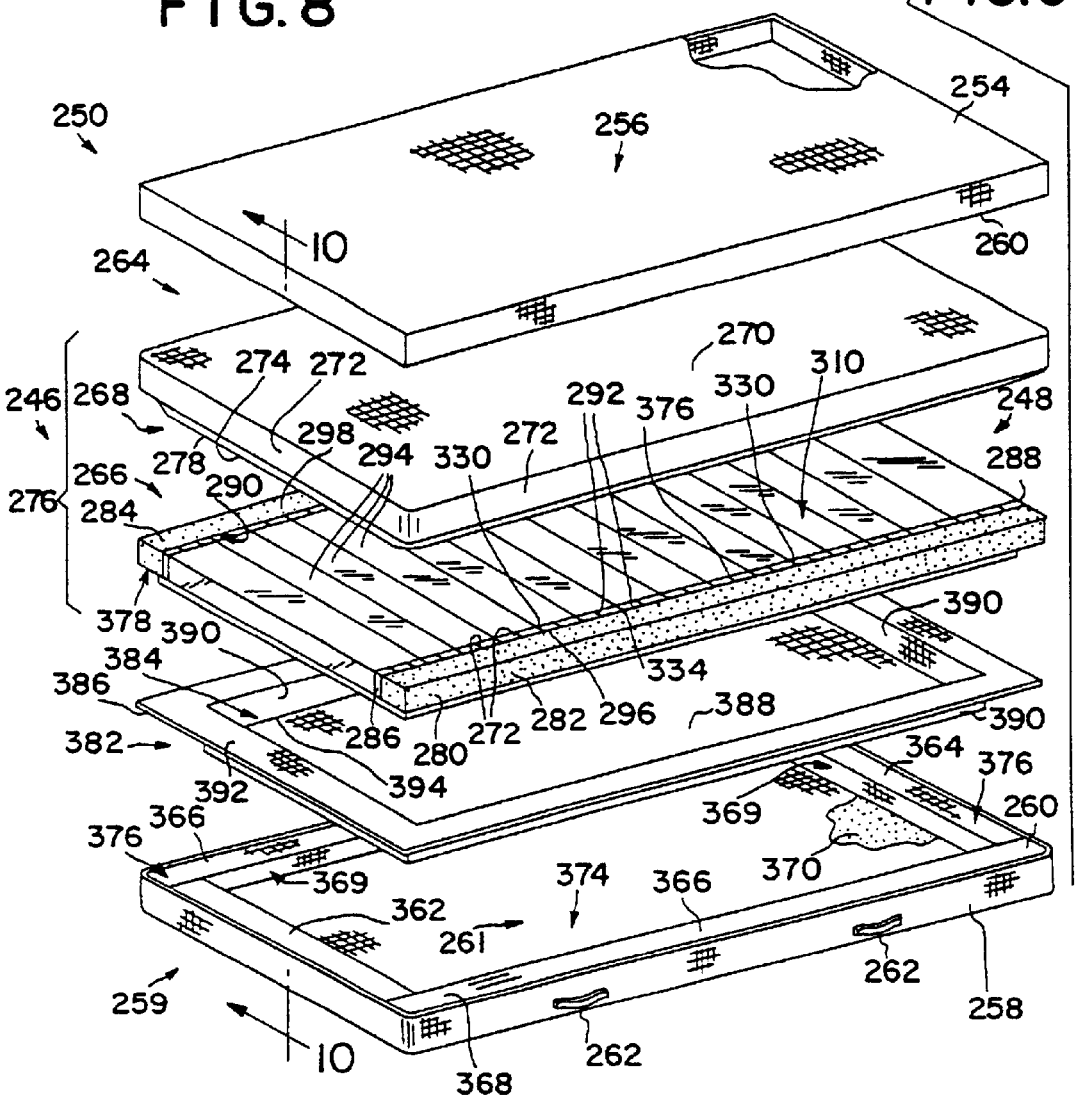

MATTRESS STRUCTURE HAVING A FOAM MATTRESS CORE

Matter enclosed in heavy brackets [ ] appears in the original patent but forms no part of this reissue specification; matter printed in italics indicates the additions made by reissue.

BACKGROUND SUMMARY OF THE INVENTION

This application is a continuation in-part of co-pending U.S. application Ser. No. 08/565/409, filed Nov. 30, 1995 now U.S. Pat. NO. 5,669,757.

The present invention relates to mattress structures and particularly to a mattress structure having a foam mattress core. The mattress structure may be configured as a stand-alone unit for use on any deck for a bed or the mattress structure may be configured for use with an associated base. More particularly, the present invention relates to a mattress structure having a foam core that is shaped and configured to provide support and firmness characteristics similar to those provided by mattresses having air bladders.

It is well know to provide foam support pads or mattresses for supporting a user reclining on the pad. For example, U.S. Pat. Nos 4,879,776; 5,038,433; 5,077,849; 5,111,542; and 5,172,439, all to Farley, disclose mattress overlays and pads for supporting a user. In addition, U.S. Pat. Nos. 4,449,261 to Magnusson and 4,991,244 to Walker disclose mattress borders for receiving core mattresses and U.S. Pat. Nos. 5,105,488 to Hutchinson et al.; 4,803,744 to Peck et al.; and 4,424,600 and 4,435,864 to Callaway disclose supporting surfaces having selectively adjustable firmness. Finally, U.S. patent application Ser. No. 08/565,409 to Washburn et al. filed Nov. 30, 1995 and assigned to an affiliate of the assignee of the present invention, the specification of which is herein incorporated by reference, discloses a mattress kit and mattresses constructed therefrom that can include a plurality foam core elements What is needed is a mattress structure having a foam core provided with longitudinally spaced and transversely extending zones providing the support and firmness characteristics typically provided by a mattress including a core having longitudinally spaced-apart air bladders. In addition, users would appreciate such a mattress having a foam mattress core of unitary construction and which is compatible with a bed having an articulating deck. Such a mattress should also include a mechanism for minimizing the sheer forces directed against the user when the bed carrying the mattress articulates.

According to the present invention, an elongated mattress core for a mattress structure is provided. The mattress core includes a foam core. The foam core has an upwardly-facing top surface, a bottom surface spaced apart from the top surface, and first and second spaced-apart elongated sides connecting the top and bottom surfaces.

The foam core is formed to include a plurality of longitudinally spaced-apart transverse slits extending downwardly from the top surface. Each slit terminates at a lower end which is spaced apart from the bottom surface by a first distance. In addition, each slit extends transversely from a first slit end spaced apart from the first side of the foam core to a second slit end spaced apart from the second side of the foam core. Each adjacent pair of slits defines a foam column. Thus, the foam core has a plurality of longitudinally spaced apart and transversely extending foam columns, each foam column having a pair of generally vertical column side walls defining the slits.

In preferred embodiments, the mattress structure includes a mattress cover defining an interior region and a foam core received in the interior region. A shear layer made from a material having a low coefficient of friction preferably covers the top and sides of the foam core and is positioned between the foam core and the mattress cover so that the mattress cover can slide relative to the foam core. Thus, if the mattress structure is used on a bed having an articulating deck, the mattress cover can slide relative to the foam core as the deck articulates to minimize the shear forces acting between the mattress cover and the user during articulation of the deck and mattress structure and instead expend those shear forces by having the mattress cover slide relative to the foam core.

The foam core also includes a plurality of longitudinally spaced apart and transversely extending foam columns. Each foam column includes a top, a bottom, and generally vertically extending and transversely extending side walls connecting the top and the bottom. The side walls of adjacent foam columns cooperate to define a plurality of longitudinally spaced-apart and transversely extending slits.

The side walls of each foam column include a low-friction coating so that each column can compress and decompress without being hindered by drag forces resulting from frictional engagement with adjacent foam columns. Preferably, the low-friction coating is a fabric or material having a low coefficient of friction which is received by the slit defined by the adjacent side walls of adjacent foam columns. Thus, the unitary foam core is in effect provided with longitudinally spaced-apart zones of foam that operate independently to provide the mattress structure with longitudinal zones similar to the zones that can be provided by air bladders.

As mentioned above, the foam core is of unitary construction. In addition, however, the foam core can be configured so that the firmness and support characteristics of each foam column is individually selected prior to manufacture. Individually selecting the support and firmness characteristics of each foam column of the mattress structure allows the mattress structure to provide support and firmness characteristics that vary along the length of the sleeping surface of the mattress structure. Having varied support and firmness characteristics allows the mattress structure to achieve a profile along the length of the mattress structure of support and firmness characteristics similar to the support and firmness characteristics that can be provided by a mattress structure having a plurality of air bladders.

The mattress structure in accordance with the present invention can be provided in a "stand-alone" first embodiment for use on any bed deck or other generally horizontal surface or a second embodiment including a separate base for supporting the mattress. With each embodiment, the foam core includes a foam frame made from relatively stiff foam bonded to a perimeter defined by the plurality of foam columns. In the first embodiment, the entire frame is attached to the plurality of columns. In the second embodiment, the frame includes an upper portion attached to the plurality of columns and a lower portion attached to the base to form a base frame so that the second embodiment of the mattress structure provides the advantages of a step deck and a mattress for a step deck as described in U.S. patent application Ser. Nos. 08/511,546 to Kramer et al. and 08/511,547 to Weismiller et al., both filed on Aug. 4, 1995 and both assigned to an affiliate of the assignee of the present invention.

Additional objects, features and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The detailed description particularly refers to the accompanying figures in which:

FIG. 1 is a perspective view of a "stand-alone" mattress structure in accordance with the present invention showing a mattress cover including a bottom cover having handles and a top cover connected to the bottom view of the zipper;

FIG. 2 is an exploded perspective view of the mattress structure of FIG. 1 showing a mattress core received between the top cover and the bottom cover of the mattress cover, the bottom cover having a portion broken away to reveal a foam bottom, the mattress core comprising a foam core including a core frame having foam side members and foam end members made from relatively stiff foam and defining a central opening therein containing a plurality of longitudinally spaced apart and transversely extending foam columns attached to the core frame so that the foam core is of unitary construction, the foam columns defining a plurality of longitudinally spaced-apart and transversely extending slits receiving shear panels made from slip fabric sandwiched between the foam columns to permit independent movement of each foam column so that each foam column compresses and decompresses without interference due to drag forces resulting from frictional engagement against adjacent foam columns, and a shear layer wrapped around the foam core and positioned to lie between the foam core and the top cover of the mattress cover so that the mattress cover can slide relative to the foam core;

FIG. 5 is an exploded perspective view of the underside of the foam core of the stand-alone mattress showing the shear panel made from slip fabric at various stages of installation, each shear panel including first and second tabs received by the slots formed between the foam columns of the foam core, first and second side panels received by the slits formed between the foam columns and separating adjacent side walls of adjacent foam columns, and a top panel covering a top surface of the foam column, the first and second tabs folding underneath and against the bottom surface of the foam core and being connected to one another by I-shaped connectors to hold each shear panel to its respective foam column;

FIG. 6 is a sectional view taken along line 6—6 of FIG. 3 showing first and second side panels of the shear panel positioned in the slit defined between adjacent side walls of adjacent foam columns, the adjacent foam columns being attached to one another beneath the slit, first and second tabs of the shear panels folded against the bottom surface of the foam core and connected by one of the I-shaped connectors penetrating both of the first and second tabs, and a shallow slit extending downwardly from the top surface of the foam column to adjust the surface tension across the foam column and thereby "fine-tune" the firmness and support characteristics of the foam column;

FIG. 7 is a sectional view taken along line 7—7 of FIG. 3 showing the foam end member on the head end of the foam core including an upper foam end member having a top surface adjacent to the top surfaces of the foam columns and a lower foam end member having a bottom surface adjacent to the bottom surfaces of the foam columns, two foam columns adjacent to the foam end member, slip fabric including a shear panel wrapped around the foam end member and the foam column adjacent to the foam end member, slots between the foam columns cooperating with slits to define openings extending from the top surface of the foam core through to the bottom surface of the foam core, and shear panels including first and second side panels and tabs extending through the slits, the tabs extending through the slots and being folded against the bottom surface of the foam core;

FIG. 8 is a perspective view of a second embodiment of a mattress structure in accordance with the present invention showing a mattress cover including a bottom cover having handles and defining a base and a top cover connected to the bottom cover by a zipper so that the mattress structure is ready for use by a user;

FIG. 9 is an exploded perspective view of the mattress structure of FIG. 8 showing a mattress core received between the top cover and the bottom cover of the mattress cover, the bottom cover of the mattress cover covering a base, the base including a perimetral rectangular base frame defining a central opening therein and receiving a foam bottom therein, a storage cover above the base used for storing the mattress core, a foam core having a rectangular core frame defining a central opening therein receiving a plurality of foam columns, a shear layer for covering the foam core, and the top cover of the mattress cover having a zipper with meets with a zipper on the top of the bottom cover to attach the top and bottom covers of the mattress cover together;

DETAILED DESCRIPTION OF THE DRAWINGS

Figure 3:
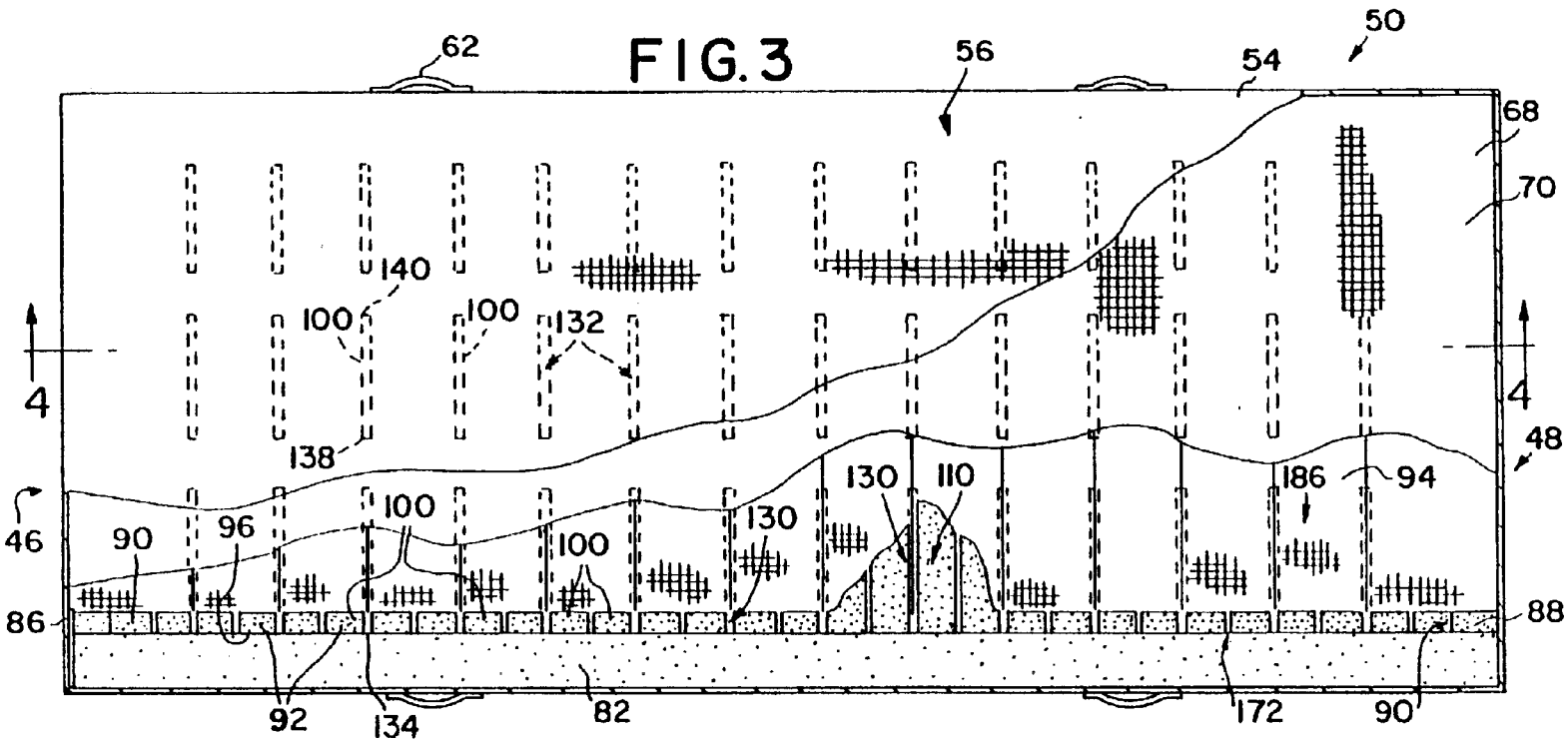
FIG. 3 is a top plan view of the mattress structure of FIG. 1 with portions broken away showing one of the foam side members of the foam frame, foam columns attached to the side member, the foam columns defining transverse slits therebetween, slots (in phantom) cooperating with the transverse slits to define openings extending from the top surface of the foam core to the bottom surface of the foam core, shear panels made from slip fabric sandwiched between the foam columns and extending therebetween across the top of the foam columns, the shear layer positioned to lie on top of the shear panels and on top of the foam core, and the top cover of the mattress cover covering the mattress core.

A first embodiment of an illustrative mattress structure 50 in accordance with the present invention is shown in FIGS. 1–7 and an illustrative second embodiment of a mattress structure 250 is shown in FIGS. 8–11. Illustrative first embodiment of mattress structure 50 in accordance with the present invention includes a mattress cover 52 having a top cover 54 and a bottom cover 58 connected to top cover 54 by a zipper 60. Top cover 54 includes an upwardly-facing sleeping surface 56 above which a user will rest. Handles 62 can be provided on either top cover 54 or bottom cover 58 as shown in FIG. 1 or on any portion of top or bottom covers 54, 58 as desired to facilitate transport of mattress structure 50.

Top and bottom covers 54, 58 of mattress cover 52 cooperate to define an interior region 64 of mattress cover 52 as shown in FIG. 2. Interior region 64 of mattress cover 52 receives a mattress core 76 including a foam core 66, shear panels 94 carried by foam core 66, and a shear layer 68 as shown in FIG. 2. In preferred embodiments, foam core 66 is made from a foam rubber material such as urethane foam, although any suitable material providing similar support and firmness characteristics to those described below for foam core 66 can be used without exceeding the scope of the invention as presently perceived.

Shear layer 68 includes a top panel 60, downwardly-extending sides 72 appended to the perimeter of top panel 70, and a fitted portion 74 appended to sides 72 and extending at least partially beneath top panel 70. Top panel 70 cooperates with sides 72 and fitted portion 74 of shear layer 68 to define an interior region (not shown) which receives foam core 66. Fitted portion 74 includes edge 78 defining an opening (not shown) beneath top panel 70 allowing for movement of foam core 66 into and out of the interior region of shear layer 68. Preferably, fitted portion 74 is provided with an elastic band (not shown), a drawstring (not shown), or other structure drawing the opening of fitted portion 74 closed to facilitate wrapping shear layer 68 snugly around foam core 66.

Mattress structure 50 may be used with a bed or table including an articulating deck (not shown) having pivoting head, shoulder, seat, thigh, or leg sections. As portions of mattress structure 50 bend during articulation of the deck, the movement of mattress structure 50 will cause mattress structure 50 to slide relative to the user resting on sleeping surface 56. If the mattress cover were to slide relative to the user and thus rub against the user during articulation of the deck, this rubbing and sliding could irritate the user's skin.

Shear layer 68 is preferably made from material having a low coefficient of friction such as nylon or "parachute" material, or any other suitable material that will allow top cover 54 of mattress cover 52 to slide relative to foam core 66. Top cover 54 will frictionally engage the user lying on sleeping surface 56 so that when mattress core 76 includes shear layer 68, top cover 54 will tend to move with the user rather than moving with foam core 66 during articulation of the deck. Thus, use of shear layer 68 will minimize the rubbing of mattress structure 50 against the user during articulation of the deck.

Foam core 66 includes a generally rectangular foam core frame 80 having an elongated foam first side member 82, an elongated foam second side member 84 spaced apart from first side member 82, a foam end member 86 abutting first and second side members 82, 84 on a head end 46 of foam core 66, and a foam end member 88 abutting first and second side members 82, 84 on a foot end 48 of foam core 66 as shown in FIG. 2. Core frame 80 defines a generally rectangular central opening 90 above which the user will rest.

A plurality of foam columns 92 is received in central opening 90 as shown in FIG. 2 and foam columns 92 are attached to core frame 80. Each foam column 92 extends transversely from a first end 96 of foam column 92 abutting first side member 82 to a second end 98 of foam column 92 abutting second side member 84. Preferably, first end 96 of each foam column 92 is attached to first side member 82 and second end 98 of each foam column 92 is attached to second side member 94.

Figure 4:
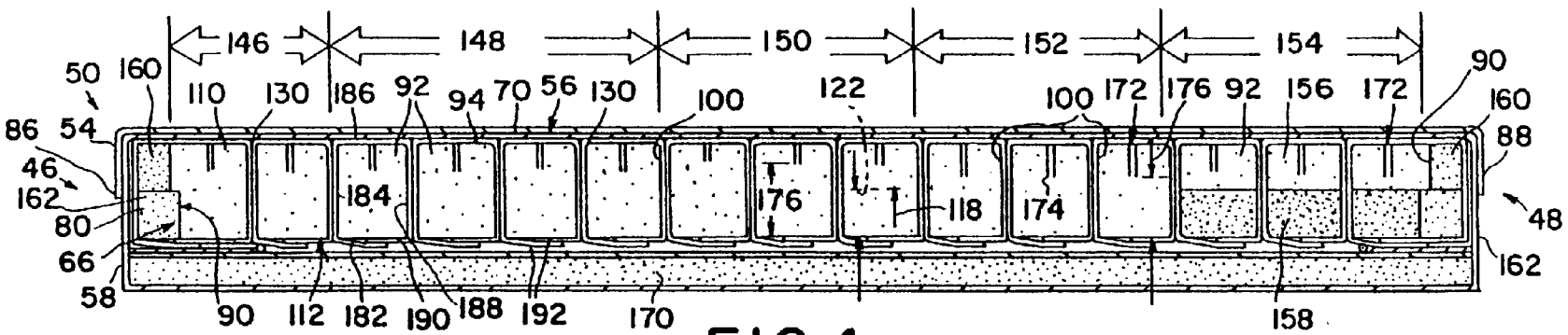
FIG. 4 is a sectional view taken along line 4—4 of FIG. 3 showing the mattress received in the base cover and including foam columns defining a head zone, a shoulder zone, a seat zone, a thigh zone, and a foot zone, slit fabric including tabs received in the slots formed between the foam columns and folding against the bottom surface of the foam core, and each foam column in the foot zone including an upper column portion made from relatively soft foam to minimize the interface pressure against the heal of the user and a lower column portion beneath the upper column portion, the lower column portion being made from relatively stiff foam to provide additional support.

Each foam column 92 includes first and second spaced-apart side walls 100 as shown best in FIGS. 3 and 4. Side walls 100 extend transversely between first and second side members 82, 84 of core frame 80. Side walls 100 also extend generally vertically from a top surface 110 to a bottom surface 112. In addition, each foam column 92 includes a top portion 114 and a bottom portion 116. In preferred embodiments, side walls 100 adjacent to bottom portion 116 of each foam column 92 are attached to bottom portions 116 of adjacent side walls 100 of both adjacent foam columns 92 so that foam core 66 including core frame 80 and foam columns 92 is of unitary construction.

Top portion 114 of each side wall 100 of each foam column 92 extends downwardly from top surface 110 by a first distance 118 as shown best in FIGS. 6 and 7. Bottom portion 116 extends upwardly from bottom surface 112 a second distance 120 to meet top portion 114 at an interface 122. In preferred embodiments, bottom portion 116 of each side wall 100 is integrally appended to bottom portion 116 of each abutting side wall 100. Preferably, the bottom portions 116 of abutting side walls 100 are joined by R.F. welding, although any suitable method for joining foam columns 92 such as gluing side walls 100 together, attaching adjacent side walls 100 using plastic rivets or other fastening devices (not shown), or starting with a unitary block of foam and sculpting the block to include a plurality of longitudinally spaced-apart and transversely extending slits defining foam columns therebetween, can be used without exceeding the scope of the invention as presently perceived.

Longitudinally spaced-apart foam columns 92 define a plurality of zones along foam core 66 which provide support and firmness characteristics for a user carried on sleeping surface 56 of mattress structure 50 as shown in FIG. 4 Illustratively, foam columns 92 define a head zone 146 adjacent to head end 46 of foam core 66, a shoulder zone 148 adjacent to head zone 146, a set zone 150 adjacent to shoulder zone 148, a thigh zone 152 adjacent to seat zone 150, and a foot zone 154 adjacent to thigh zone 152 and foot end 48 of foam core 66. Foot zone 154 of illustrative and preferred foam core 66 includes three foam columns 92, each of which include an upper column portion 156 and a lower column portion 158 as shown best in FIG. 4. Likewise, illustrative and preferred frame end members 86, 88 each include an upper end member 160 and a lower end member 162.

The firmness and support characteristics provided by each foam column 92 depend in part upon the indention load deflection (ILD) of the foam from which each foam column 92 is made. The ILD is a well-known industry-accepted index indicating the "firmness" of materials such as urethane foam and other foam rubber materials. The ILD indicates the amount of deflection exhibited by a block of foam when subjected to a specified force distributed over a specified area of foam. It is within the scope of the invention as presently perceived to provide foam core 66 wherein each of the plurality of foam columns 92 has the same ILD or to provide foam core 66 wherein the ILD of at least one foam column 92 is different from the ILD of at least one other foam column 92. For example, preferred foam core 66 can be constructed so that foam columns 92 of head zone 146 have an ILD of 11, foam columns 92 of should zone 148 have an ILD of 11, foam columns 92 of seat zone 150 have an ILD of 17, foam columns 92 of thigh zone 152 have an ILD of 11, foot zone 154 lower column portions 158 have an ILD of 11, and foot zone 154 upper column portions 156 have an ILD of 7. Although it is preferred that foam columns 92 be made from foam having ILDs as described above, foam columns 92 can be made from foam rubber portions of various ILDs to provide the desired support and firmness characteristics for mattress structure 50. For example, it is sometimes desirable to provide foam columns 92 made from foam having an ILD of 17 in shoulder zone 148 to provide additional firmness and support characteristics to mattress structure 50 adjacent to shoulder zone 148.

Foot zone 154 is provided with upper and lower column portions 156, 158 to relieve interface pressure against the heel of the user while also providing sufficient support for the user's feet. This is achieved by providing upper column portions 156 made from foam having a relatively low ILD and relatively plush support and firmness characteristics, and lower column portions 158 made from foam having a higher ILD to provide additional firmness and support.

It can also be seen that head end and foot end members 86, 88 are each provided with upper and lower end members 160, 162 to achieve a similar result. Each upper end member 86 of illustrative and preferred foam core 66 is made from foam having an ILD matching the ILD of the adjacent foam column 92. For example, upper end member 160 of head end foam member 86 of illustrative foam core 66 is made from foam having an ILD of 11 just as foam columns 92 of head zone 46 are made from foam having an ILD of 11. Similarly, upper end member 160 of foot end member 88 of illustrative form core 66 is made from foam having an ILD of 7, just as upper column portions 156 of foam columns 92 of foot zone 154 are made from foam having an ILD of 7. However, lower end members 162 are preferably made from urethane foam having an ILD of 41 which provides significantly greater support and firmness characteristics than upper end members 160. Thus, by forming head end and foot end members 86, 88 from upper end members 160 made from foam having ILDs similar to those of the adjacent foam columns 92 and lower end members 162 providing significantly greater support and firmness characteristics, head end and foot end members 84, 86 provide support and firmness characteristics to a user lying on sleeping surface 56 that are substantially similar to other portions of sleeping surface 56 while also providing additional support to a user entering or exiting mattress structure 50 from either head end 46 or foot end 48.

First and second side members 82, 84 include longitudinally extending upper side member 164 and longitudinally extending lower side member 166 as shown in FIGS. 1 and 5. In preferred mattress structure 50, upper and lower side member 164, 166 of foam core 66 are each made from foam having an ILD of 41 to provide additional support and firmness characteristics along sides of mattress structure 50. The additional support and firmness characteristics along side of mattress structure 50 assist users entering or exiting sleeping surface 56 along the sides of mattress structure 50. If desired, first and second side members 82, 84 can each be unitary members.

Although upper and lower side members 164, 166 of illustrative and preferred core frame 80 of foam core 66 are both made from urethane foam having an ILD of 41, it is within the scope of the invention as is presently perceived to provide upper and lower side members 164, 166 providing different support and firmness characteristics. For example, upper side member 164 could be made from foam having an ILD of 17 and lower side member 166 could be made from foam having an ILD of 41 so that aide members 82, 84 of core frame 80 provide additional support to users egressing or ingressing onto sleeping surface 56 while also providing a user on sleeping surface with support and firmness characteristics that are similar to the support and firmness characteristics of other portions of sleeping surface 56. Thus, the foam materials and the firmness and support characteristics resulting therefrom can be varied without exceeding the scope of the invention as presently perceived.

Each side wall 100 adjacent to top portion 114 of side wall 100 cooperates with top portion 114 of abutting side wall 100 to define a transversely-extending slit 130. Side walls 100 of the plurality of foam columns 92 thus cooperate to define a plurality of longitudinally spaced-apart and transversely-extending slits 130 as shown in FIGS. 2–4, 6, and 7. Each slit 130 has an upper end adjacent to top surface 110 of foam core 66 and a lower end 130 adjacent to interface 122 between top and bottom portions 114, 116. In addition, each side wall 100 adjacent to bottom portion 116 of side wall 100 cooperates with bottom portion 116 of abutting side wall 100 to define a transversely extending slot 132 beneath slit 130. Side walls 100 of the plurality of foam columns 92 thus cooperate to define a plurality of longitudinally spaced-apart and transversely-extending slots 132, each slot 132 being beneath a slit 130 as shown best in FIGS. 3, 5, and 7. Illustratively, each slot 132 is associated with a slit 130 which is defined by the same adjacent side walls 100 as slot 132. Each slot 132 includes a first end 138 spaced apart from the first end 134 of its associated slit 130 and a second end 140 spaced apart from the second end 136 of its associated slit 130 so that illustrative slots 132 do not extend the full transverse length of slits 130.

In illustrative and preferred foam core 66, three transversely spaced-apart slots 132 are associated with each slit 130 as shown in FIG. 3. Slots 132 are transversely spaced apart from one another and are transversely spaced apart from first side member 82 and second side member 84 of core frame 80. In preferred embodiments, bottom portions 116 of adjacent side walls 100 are attached to one another along portions of bottom portion 116 between slots 132.

As described above, slits 130 extend downwardly from top surface 110 of foam core 66 as shown best in FIGS. 6 and 7. Slots 132 extend upwardly from bottom surface 112 and cooperate with slits 130 to define openings extending from top surface 110 to bottom surface 112 of foam core 66 as shown best in FIG. 7.

If desired, each foam column 92 can also be formed to include a shallow slit 172 as shown best in FIGS. 4, 6, and 7. Each shallow slit 172 extends downwardly from top surface 110 to a lower end 174 of shallow slit 172, the lower end 174 being spaced apart from bottom surface 112 a distance 176. Typically, distance 176 is greater than distance 120 between lower end 142 of slit 130 and bottom surface 112 of foam core 66. Thus, slit 130 extends downwardly from top surface 110 into foam core 66 a distance greater than shallow slit 172 extends from top surface 110 into foam core 66.

Shallow slits 172 are formed in foam columns 92 to "fine-tune" the support and firmness characteristics provided by each foam column 92. Shallow slits 172 operate to relieve surface tension formed across top surface 110 of each foam column 92. Shallow slit 172 relieves surface tension from top surface 110 of foam column 92 and allows foam column 92 to provide columnar support from below instead of "hamocking" and providing sideways support through surface tension in top surface 110.

As described above, support and firmness characteristics provided by each zone 146, 148, 150, 152, 154 of foam core 66 can be altered by making foam columns 92 of each zone 146, 148, 150, 152, 154 from foam having an ILD that is different from the ILD of foam columns 92 of other of zones 146, 148, 150, 152, 154. In addition, the support and firmness characteristics provided by foam columns 92 can be further adjusted by forming foam columns 92 to include shallow slits 172. Illustrative and preferred foam core 66 is formed so that each foam column 92 is formed with a shallow slit 172 and so that a distance 176 between a lower end 174 of shallow slit 172 and bottom surface 112 of foam core 66 is equivalent for each shallow slit 172 within each zone 146, 148, 150, 152, 154.

However, as shown best in FIG. 4, distance 176 for shallow slits 172 varies from zone to zone 146, 148, 150, 152, 154. For example, distance 176 for shallow slits 172 of seat zone 150 is greater than distance 176 for shallow slits 172 of thigh zone 152. Thus, while the support and firmness characteristics provided by foam columns 92 of seat zone 150 are adjusted slightly by reducing the hamocking effect in seat zone 150, the support and firmness characteristics provided by foam columns 92 of thigh zone 152 are adjusted even further by providing shallow slits 172 that extend deeper into foam core 66 from top surface 110 to provide even further adjustment of thigh zone 152 so that thigh zone 152 provides even softer, plusher support and firmness characteristics than would otherwise be provided.

Side walls 100 of foam columns 92 are provided with an "anti-friction" shear coating so that each top surface 110 of each foam column 92 can move upwardly and downwardly relative to bottom surface 112 of foam core 66 independently of the upward and downward movement of top surfaces 110 of adjacent foam columns 92 as each foam column 92 compresses and decompresses relative to adjacent foam columns 92. Producing foam core 66 without the shear coating on side walls 100 would limit the independent movement of each foam column 92. Instead, each foam column 92 would interact with each adjacent foam column 92 as each side wall 100 frictionally engages each adjacent side wall 100. This interaction due to the frictional engagement of abutting side walls 100 would significantly reduce the ability of adjacent foam columns 92 to compress and decompress independently of one another, thus reducing the ability of mattress structure 50 to provide support and firmness characteristics similar to those provided by mattress structures having longitudinally spaced-apart air bladders.

In preferred embodiments, the "anti-friction" shear coating is provided by shear panels 94 of mattress core 76 as shown best in FIG. 5. Each shear panel 94 includes a generally horizontal top panel 186 having two spaced-apart side edges, a first side panel 184 appended to the first edge of top panel 186 and extending downwardly therefrom, a first tab 182 appended to first side panel 184 and extending downwardly therefrom, a second side panel 188 appended to the second edge of top panel 186 and extending downwardly therefrom, second side panel 188 being spaced apart from first side panel 184, and a second tab 190 appended to second side panel 188 and extending downwardly therefrom.

First and second side panels 184, 188 are received in slits 130 as shown best in FIGS. 5–7 to separate the abutting side walls 100 so that adjacent foam columns 92 are free to compress and decompress without interference due to frictional engagement with side walls 100 of adjacent foam columns 92. First and second tabs 182, 190 are received in slots 132 and have exposed ends 192 that extend therethrough as shown best in FIGS. 5 and 7. In preferred embodiments, exposed end 192 of first tab 182 is attached to exposed end 192 of second tab 190 to connect shear panel 94 to foam core 66. Although the preferred installation of shear panel 94 includes joining exposed ends 192 of first and second tabs 182, 190 to hold shear panel 182 to form core 66, other methods of connecting shear panel 94 to foam core 66 can be employed without exceeding the scope of the invention that is presently perceived. For example, first and second side panels 184, 188 can each be directly attached to a side wall 100 of foam columns 192.

In preferred embodiments, exposed ends 192 of first and second tabs 182, 188 are connected to one another using I-shaped connectors 194 as shown in FIGS. 5–7. Each I-shaped connector 194 includes an upper bar 196, a lower bar 198, and a connecting post 200 therebetween. Preferably, I-shaped connectors 194 penetrate both exposed ends 192 of first and second tabs 182, 188 so that upper bar 196 is positioned to lie between exposed ends 192 and foam core 66, connecting post 200 is received by openings formed in exposed ends 192 and extends downwardly from upper bar 196 to lower bar 198 which is positioned to lie beneath exposed ends 192 of first and second tabs 182, 190.

Each shear panel 94 is formed to include openings 210 positioned to lie between longitudinally spaced apart first tabs and additional openings 210 positioned to lie between longitudinally spaced apart second tabs as shown best in FIG. 5. Each opening 210 is defined by a downwardly-facing first edge 212 and by side edges 214. When shear panel 94 is installed in foam core 66, edge 212 is positioned to lie adjacent to interface 22 and lower end 142 of each slit 130 as shown in FIG. 6. Thus, shear panel is positioned to lie adjacent to top portion 114 of each side wall 100 that is in abutting engagement with top portion 114 of an adjacent side wall 100 and bottom portion 116 of each side wall 100 that is in abutting engagement with bottom portion 116 of an adjacent side wall 100 while openings 210 of shear panels 94 correspond to portions of foam core 66 at which bottom portions 116 of side walls 100 of abutting foam columns 92 are attached to one another.

Illustrative shear panels 94 are each wrapped individually around an associated foam column 92 as shown, for example, in FIG. 5 so that mattress core 76 includes a plurality of shear panels 94. However, it is within the scope of the invention as presently perceived to provide shear panels 94 connected into a single sheet including a plurality of integrally appended shear panels 94. For example, it may be found to be advantageous to provide a sheet including multiple shear panels connected to one another at tabs 182, 190 so that second tabs 190 of a first shear panel 94 are connected to first tabs 182 of a second shear panel 94. This pattern could be continued having second tabs 190 of the second shear panel 94 connected to first tabs 182 of a third shear panel 94, and so on as desired. Thus, it is within the scope of the inventions as presently perceived to provide a plurality of individual and separate shear panels 94 or to provide a plurality of shear panels 94 connected to one another.

Shear panels 94 are preferably made from a material having a low coefficient of friction such as nylon or "parachute material." Although shear panels 94 are preferably made from nylon, any material having a low coefficient friction and that will allow adjacent foam columns 92 to compress and decompress independently of one another can be placed in slits 130 and slots 132 without exceeding the scope of the invention as presently perceived. In addition, it is within the scope of the invention as presently perceived to attach or adhere shear panels 94 to side walls 100 of foam columns 92, to form the shear coating as an additional layer bonded to side walls 100, or to form side walls 100 to include an integral shear coating.

Use of shear panel 94 thus allows each foam column 92 to compress and decompress independently of each adjacent foam column 92. It is therefore within the scope of the invention as presently perceived to provide an "anti-friction" coating on side walls 100, to provide a shear panel made from nylon or another material having a low coefficient of friction, or to provide a sheet (not shown) of material having a low coefficient of friction including panels that are received by slits 130 and slots 132 so that foam columns 92 can compress and decompress and top surfaces 110 of foam columns 92 can move upwardly and downwardly independent of the position or movement of adjacent top surfaces 110 of abutting foam columns 92.

The stand alone first embodiment of mattress structure 50 includes mattress core 76 received in interior region 64 of mattress cover 52 as shown in FIGS. 2 and 4. Mattress cover 52 includes top cover 54 connected to bottom cover 58 by zipper 60 and bottom cover 58 includes foam base 170 which is positioned to lie beneath mattress core 76. Mattress structure 50 can be assembled simply by placing foam core 66 and shear layer 68 of mattress core 76 into bottom cover 58, placing top cover 54 over mattress core 76 and shear layer 68, and connecting top cover 54 to bottom cover 58 using zipper 60.

Mattress core 76 includes foam core 66 carrying shear panels 94 and shear layer 68 which is formed to include an interior region receiving foam core 66 and shear panels 94. Foam core 66 is formed to include a plurality of longitudinally spaced-apart foam columns 92. Shear panels 94 operate to minimize friction between abutting side walls 100 of foam columns 92 so that each foam column 92 can compress and decompress independently of abutting foam columns 92 and so that top surface 110 of each foam column 92 can move upwardly and downwardly independently of the position of top surfaces 110 of abutting foam columns 92. This independent movement of adjacent foam columns provides mattress structure 50 with support and firmness characteristics similar to those provided when mattress structure 50 includes a mattress core 76 having a plurality of longitudinally spaced-apart air bladders instead of foam core 66.

Mattress structure 50 is compatible with beds having articulating decks on which mattress structure 50 rests so that longitudinally spaced-apart zones of the articulating deck more relative to one another. Some conventional mattresses used on articulating decks direct shear forces created during the articulation of the mattress on the deck directly against the user resting on the sleeping surface of the conventional mattress. These shear forces result from the expansion and contraction of the sleeping surface and of the surface of the user engaging the sleeping surface due to the bending and straightening of these surfaces during deck articulation. Mattress structure 50, however, includes shear layer 68 positioned to lie between top cover 54 of mattress cover 52 and foam core 66. Shear layer 68 allows top cover 54 to slide relative to foam core 66. Top cover 54 frictionally engages the user so that top cover 54 will tend to expand and contract with the user and will slide relative to foam core 66, thus minimizing shear forces directed by mattress structure 50 against the user on sleeping surface 56.

The stand alone first embodiment of mattress structure 50 can be placed on any generally horizontal upwardly-facing surface upon which a user may rest. Second embodiment of mattress structure 250, shown in FIGS. 8–11, can also be placed on any generally horizontal, upwardly-facing surface. However, mattress structure 250 includes a mattress core 276 shaped for use with a base 259.

Mattress structure 250 includes a mattress cover 252 having the top cover 254 and the bottom cover 258 connected to top cover 254 by a zipper 260 as shown in FIG. 8. Top cover 254 includes an upwardly-facing sleeping surface 256 above which a user will rest. Handles 262 can be provided either on top cover 254 or bottom cover 258 as shown in FIGS. 8 and 9 or on any other portion of top or bottom covers 254, 258 as desired to facilitate transport of mattress structure 250.

Top and bottom covers 254, 258 of mattress cover 252 cooperate to define an interior region 264 of mattress cover 252 as shown in FIG. 9. Bottom cover 258 includes base 259 which is formed to include a central opening 261 defining a portion of interior region 264 of mattress cover 252.

Interior region 264 of mattress cover 252 receives mattress core 276 including a foam core 266, shear panels 294 carried by foam core 266, and a shear layer 268 as shown in FIG. 9. In preferred embodiments, foam core 266 is made from a foam rubber material such as urethane foam, although any suitable material providing similar support and firmness characteristics to those described above for foam core 66 and below for foam core 266 can be used without exceeding the scope of the invention as presently perceived.

Shear layer 268 includes a top panel 270, downwardly-extending sides 272 appended to the perimeter of top panel 270, and fitted portion 274 appended to the sides 272 and extending at least partially beneath top panel 270. Top panel 270 cooperates with sides 272 and fitted portion 274 of shear layer 268 to define an interior region (not shown) which receives foam core 266. Fitted portion 274 includes edge 278 defining an opening (not shown) beneath top panel 270 allowing for movement of foam core 266 into and out of the interior region of shear layer 268. Preferably, fitted portion 274 is provided with an elastic band (not shown), a drawstring (not shown), or other structure drawing the opening of fitted portion 274 closed to facilitate wrapping shear layer 268 snugly about foam core 266.

Foam core 266 includes a generally rectangular foam core frame 280 including an elongated foam first side member 282, an elongated foam second side member 284 spaced-apart from first side member 282, a foam end member 286 abutting first and second side members 282, 284 on a head end 246 of foam core 266, and a foam end member 288 abutting first and second side members 282, 284 on a foot end 248 of foam core 266 as shown in FIG. 9. Core frame 280 defines a generally rectangular central opening 290 above which the user will rest.

Figure 10:
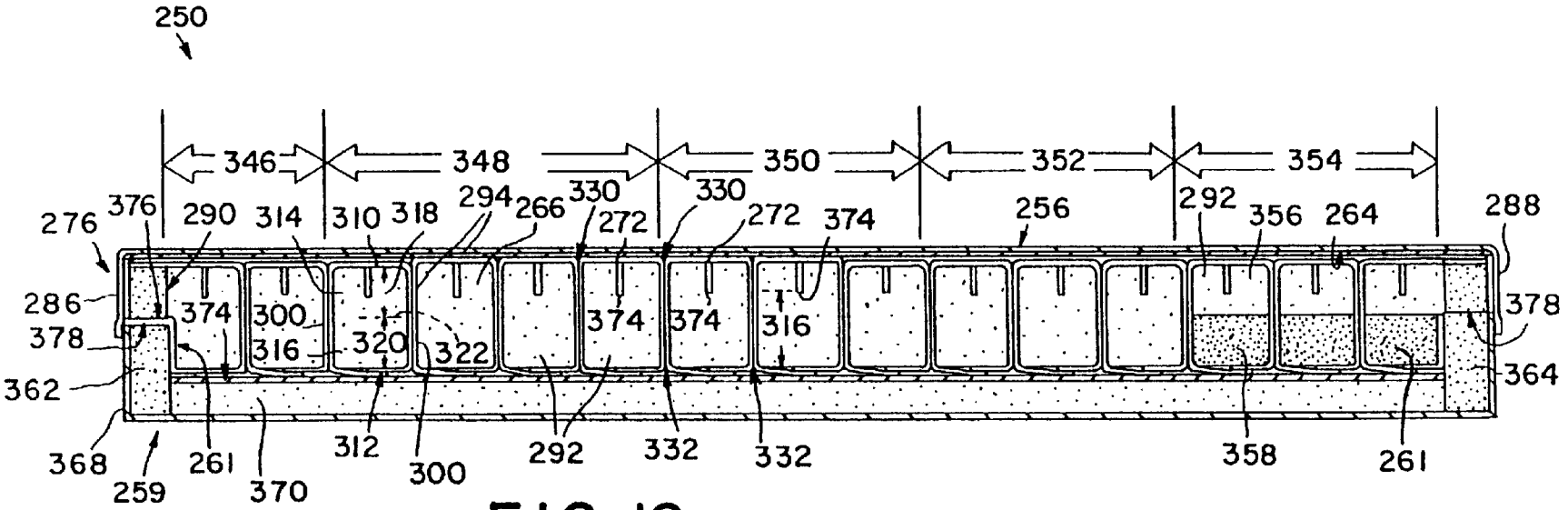
FIG. 10 is a sectional view taken along line 10—10 of FIG. 9 showing the mattress core received in the base and including foam columns defining a head zone, a shoulder zone, a seat zone, a thigh zone, and a foot zone, slip fabric including tabs received in the slots formed between the foam columns and folding against the bottom surface of the foam core, and each foam column in the foot zone including an upper column portion made from relatively soft foam to minimize the interface pressure against the heel of the user and a lower column portion beneath the upper column portion, the lower column portion being made from relatively stiff foam to provide additional support.

A plurality of foam columns 292 is received in central opening 290 as shown in FIGS. 9 and 10 and foam columns 292 are attached to core frame 280. Each foam column 292 extends transversely from the first end 296 of foam column 292 abutting first side member 282 to a second end 298 of foam column 292 abutting second side member 284. Preferably, first end 296 of each foam column 292 is attached to first side member 282 and second end 298 of each foam column 292 is attached to second side member 284.

Each foam column 292 includes first and second spaced-apart side walls 300 as shown best in FIG. 10. Side walls 300 extend transversely between first and second side members 282, 284 of core frame 280. Side walls 300 also extend generally vertically from the top surface 310 to a bottom surface 312 and each foam column 292 includes a top portion 314 and a bottom portion 316. In preferred embodiments, side walls 300 adjacent to bottom portion 316 of each foam column 292 are attached to bottom portions 316 of adjacent side walls 300 of both adjacent foam columns 292 so that foam core 266 including core frame 280 and foam columns 292 is of unitary construction.

Top portion 314 of each of side wall 300 of each foam column 292 extends downwardly from top surface 310 by a first distance 318 shown best in FIG. 10. Bottom portion 316 extends upwardly from bottom surface 312 a second distance 320 to meet top portion 314 at an interface 322. In preferred embodiments, bottom portion 316 of each side wall 300 is attached to bottom portion 316 of each abutting side wall 300. Preferably, the bottom portions 316 of abutting side walls 300 are joined by R.F. welding, although any suitable method for joining foam columns, such as gluing side walls 300 together, attaching adjacent side walls 300 using plastic rivets or other fastening devices (not shown), or starting with a unitary block of foam and sculpting the block to include a plurality of longitudinally spaced-apart and transversely extending slits defining foam columns therebetween can be used without exceeding the scope of the invention as presently perceived.

As with foam core 66, longitudinally spaced-apart foam columns 292 of foam core 266 define a plurality of zones along foam core 266 which provide support and firmness characteristics for a user carried on sleeping surface 256 of mattress structure 250 as shown in FIG. 10. Illustratively, foam columns 292 define a head zone 346 adjacent to head end 246 of foam core 266, a shoulder zone 348 adjacent to head zone 346, a seat zone 350 adjacent to shoulder zone 348, a thigh zone 352 adjacent to seat zone 350, and a foot zone 354 adjacent to thigh zone 352 and foot end 248 of foam core 266. Foot zone 354 of illustrative and preferred foam core 266 includes three foam columns 292, each of which include an upper column portion 356 and a lower portion 358 as shown best in FIG. 11 so that foot zone 354 can be made from foam rubber materials having different ILDs allowing foam columns 292 on-foot zone 254 to relieve interface pressure against the heel of the user while also providing sufficient support for the user's feet.

Each side wall 300 adjacent to top portion 314 of side wall 300 cooperates with top portion 314 of abutting side wall 300 to define a transversely-extending slit 330. Side walls 300 of the plurality of foam columns 292 thus cooperate to define a plurality of longitudinally spaced-apart and transversely-extending slits 300 as shown in FIG. 10. In addition, each side wall 300 adjacent to bottom portion 316 of side wall 300 cooperates with bottom portion 316 of abutting side wall 300 to define a transversely-extending slot 322 beneath slit 330. Side walls 300 of the plurality of foam columns 292 thus cooperate to define a plurality of longitudinally spaced-apart and transversely-extending slots 332, each slot 332 being beneath a slit 330 as shown best in FIG. 10. Each slot 332 is associated with a slit 330 that is defined by the same adjacent side walls 300 as slot 332. Each slot 332 of illustrative foam core 266 includes a first end (not shown) spaced-apart from first end 334 of its associated slit 330 and a second end (not shown) spaced-apart from the second end 336 of its associated slit 330 so that illustrative slots 332 to not extend the full transverse distance of slits 330.

As with foam core 66, slits 330 of foam core 266 extend downwardly from top surface 310 of foam core 266 as shown best in FIG. 10. Slots 332 extend upwardly from bottom surface 312 and cooperate with slits 330 to define openings extending from top surface 310 to bottom surface 312 of foam core 266.

If desired, each foam column 292 can also be formed to include a shallow slit 372 as shown in FIG. 10. Each shallow slit 372 extends downwardly from top surface 310 to a lower end 374 of shallow slit 372, lower end 374 being spaced-apart from bottom surface 312 by a distance 376. Typically, distance 376 is greater than distance 320 between lower end 342 of slit 330 and bottom surface 312 of foam core 266. Thus, slit 330 extends downwardly from top surface 310 into foam core 266 a distance greater than shallow slit 372 extends from top surface 310 into foam core 266.

Side walls 300 of foam columns 292 are provided with an anti-friction shear coating so that each top surface 310 of each foam column 292 can move upwardly and downwardly relative to bottom surface 312 of form core 266 independently of the upward and downward movement of top surfaces 310 of adjacent foam columns 292 as each foam column 292 compresses and decompresses relative to adjacent foam columns 292. The anti-friction shear coating minimizes the interaction due to frictional engagement of abutting side walls 300, which, in the absence of the shear coating, could significantly reduce the ability of adjacent foam columns 292 to compress and decompress independently of one another, thus reducing the ability of mattress structure 250 to provide support and firmness characteristics similar to those provided by mattress structure having longitudinally spaced apart air bladders. In preferred embodiments, the anti-friction shear coating is provided by shear panels 294 of mattress core 276 as shown best in FIGS. 9 and 10.

Shear panels 294 are preferably made from a material having a low coefficient of friction such as nylon or parachute material. Although shear panels 94 are preferably made from nylon, any material having a low coefficient of friction that will minimize the frictional engagement between abutting side walls 100 of adjacent foam columns 292 and allow adjacent foam columns 292 to compress and decompress independently of one another can be placed in slits 330 and slots 332 without exceeding the scope of the invention as presently perceived. Likewise, shear layer 268 is also preferably made from a material having a low coefficient of friction such as nylon, parachute material, or any other suitable material having a low coefficient-of friction and that will allow top cover 254 to slide relative to mattress core 276 and foam core 266 during folding or bending movement of portions of mattress structure 250 relative to other portions of mattress structure 250.

As described above, top dover 254 and bottom cover 258 cooperate to define interior region 264 of mattress cover 252 as shown in FIGS. 9 and 10. In addition, bottom cover 258 covers base 259 that defines central opening 261 which comprises a portion of interior region 264. Base 259 includes a generally horizontal foam base 370 surrounded by base frame 368.

Base frame 368 includes a head end member 362, a foot end member 364 longitudinally spaced-apart from head end member 362, and transversely spaced-apart side members 366 attached to each of the head and foot end members 362, 364 as shown in FIG. 9. Thus, each of end members 362, 364 and side members 366 are integrally appended to foam base 370 as shown in FIG. 10 and each includes a side surface cooperating with side surfaces of each other member 362, 364, 366 to define an inwardly-directed side surface 369 of base frame 368. Foam base 370 includes a top surface 374, and top surfaces of side members 366 and end members 362, 364 cooperate to define a generally planer top surface 376 of base frame 368. Illustrative foam base 370 is preferably made from relatively stiff foam rubber such as, for example, foam rubber having an ILD of 44, and end members 362, 364 and side members 366 are likewise preferably made from foam rubber having an ILD of 44 to provide mattress structure 250 with relatively firm firmness and support characteristics around the perimeter of mattress structure 250. Providing mattress structure 250 including base frame 370 having relatively firm firmness and support characteristics around the perimeter of mattress structure 250 will assist the user when entering or exiting sleeping surface 256 of mattress structure 250.

Members 282, 284, 286, 288 of core frame 280 preferably extend downwardly from top surface 310 of foam core 266 by distance 318 to bottom surfaces adjacent to interface 322 as shown in FIG. 10 so that the bottom surfaces of members 282, 284, 286, 288 of core frame 280 cooperate to define a generally planer downwardly-facing bottom surface 378 of core frame 280 as shown in FIGS. 9 and 10. When mattress core 276 is received by base 259, bottom surface 378 of core frame 280 engages top surface 376 of base frame 368. Also, in preferred embodiments, when mattress core 276 is received by base 259, bottom surface 312 of foam core 266 engages top surface 374 of foam base 370. Thus, base 259 includes base frame 368 having side members 366 and end members 362, 264 that extend upwardly from top surface 374 of foam base 370 and include inwardly-facing side surfaces 369 engaging mattress core 276 to prevent mattress core 276 from moving longitudinally or laterally relative to base 259. Likewise, mattress core 276 is configured to conformingly nest in base 259. Thus, base 259 and mattress core 276 provide some of the advantages of a step deck and mattress as described in U.S. patent application Ser. Nos. 08/511,546 to Kramer et al. and 08/511,547 to Weismiller et al., both filed on Aug. 4, 1995, the specifications of which are herein incorporated by reference.

Figure 11:
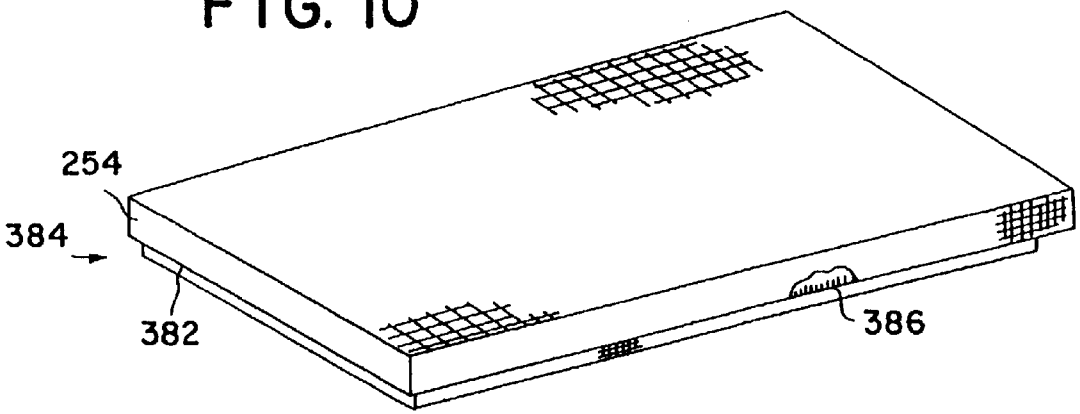
FIG. 11 is a view of the mattress core of FIG. 8 sandwiched between the top cover of the mattress cover and the storage cover, the storage cover including a perimetral zipper that meets with the zipper on the mattress cover to attach the storage cover to the top cover of the mattress cover for use in storing the foam core.

Mattress structure 250 also includes a storage cover bottom 382 as shown in FIGS. 9 and 11. Storage cover bottom 382 is not part of mattress core 276 and is not received in interior region 264 of mattress cover 252. Instead, storage cover bottom 382 cooperates with top cover 254 of mattress cover 252 to define a storage cover 384 for protecting mattress core 276 during storage of mattress core 276. Storage cover bottom 382 includes a perimetral zipper 386 that engages zipper 260 on top cover 254 to attach storage cover bottom 382 to top cover 254.

Storage cover bottom 382 and top cover 254 cooperate to define an interior region of storage cover 384 receiving mattress core 276 as shown in FIG. 9. Storage cover bottom 382 includes a bottom panel 388 having a generally rectangular perimetral edge 394, sides 390 extending upwardly from perimetral edge 394, and a generally horizontal flange 392 extending outwardly from sides 390. Flange 392 includes a generally rectangular outer perimetral edge and zipper 386 is attached to the edge of flange 392 as shown in FIG. 9.

Bottom panel 388 and sides 390 of storage cover bottom 382 cooperate to define storage space 384 receiving mattress core 276 as shown in FIG. 9. Preferably, mattress core 276 and storage cover bottom 283 are configured so that bottom surface 378 of core frame 280 engages flange and bottom surface 312 of foam core 266 engages bottom panel 388 of storage cover bottom 382 when foam core 266 is received in storage cover 384. Once mattress core 276 is received in the interior region of storage cover 384 and zipper 386 is closed to attach storage cover bottom 382 to top cover 254, mattress core 276 can be easily stored and a different mattress core (not shown) can be used with base 259.

Although the invention has been described in detail with reference to preferred embodiments, additional variations and modifications exist within the scope and spirit of the invention as described and defined in the following claims.

We claim:

1. An elongated mattress core for a mattress structure, the mattress core comprising:

a foam core including an upwardly-facing top surface, a bottom surface spaced apart from the top surface, and first and second elongated sides connecting the top and bottom surfaces, the foam core being formed to include a plurality of longitudinally spaced apart transverse slits extending downwardly from the top surface, each slit terminating at a lower end spaced apart from the bottom surface by a first distance and extending transversely from a first slit end spaced apart from the first side of the foam core to a second slit end spaced apart from the second side of the foam core, each adjacent pair of slits defining a foam column so that the foam core has a plurality of longitudinally spaced apart and transversely extending foam columns, each foam column having a pair of generally vertical column side walls defining the slits, each column side wall including a shear coating having a low coefficient of friction so that each column can compress and decompress without drag forces resulting from frictional engagement with adjacent column side walls interfering with the compression and decompression.

2. The mattress core of claim 1, wherein the shear coating includes a material having a low coefficient of friction received by at least one slit of the plurality of slits.

3. The mattress core of claim 1, wherein at least one foam column is formed to include a shallow second slit extending downwardly from the top surface and terminating at a lower end spaced apart from the bottom surface by a second distance and extending transversely from a first shallow slit end spaced apart from the first side of the core to a second slit end spaced apart from the second side of the core, the second distance being greater than the first distance.

4. The mattress core of claim 1, wherein the plurality of foam columns includes a foam first column made from foam rubber having a first indention load deflection and a foam second column made from foam rubber having a second indention load deflection, the second indention load deflection being different from the first indention load deflection.

5. The mattress core of claim 4, wherein the top surface of the first column is formed to include a transverse cut extending downwardly from the top surface so that the support and firmness characteristics of the mattress adjacent to the first column are different from the support and firmness characteristics provided by the first column before forming the transverse cut.

6. The mattress core of claim 1, wherein the foam core includes a frame including an elongated first foam side member having an inner side surface and an outer side surface spaced apart from the inner side surface and defining the first side of the foam core and an elongated second foam side member having an inner side surface and an outer side surface spaced apart from the inner side surface and defining the second side of the foam core, the slits extending transversely from the inner side surface of the first foam side member to the inner side surface of the second foam side member.

7. The mattress core of claim 6, wherein the frame includes first and second foam end members, each foam end member abutting both of the first and second foam side members and each foam end member engaging one foam column.

8. The mattress core of claim 7, wherein the first and second foam end members and the first and second foam side members each have an indention load deflection that is greater than the indention load deflection of the plurality of foam columns so that the mattress structure has greater firmness and support characteristics along the perimeter of the mattress.

9. The mattress core of claim 1, wherein the foam core includes longitudinally spaced apart head, shoulder, seat, thigh, and foot zones, each zone including at least one foam column, the foam columns of each zone being made from foam having a selected indention load deflection, the indention load deflection of the foam in each zone being selectable for each zone independently of the other zones.

10. The mattress core of claim 9, wherein one foam column of the foot zone includes an upper column portion having a selected first indention load deflection and a lower column portion beneath the upper column portion having a selected second indention load deflection greater than the first indention load deflection so that the lower column portion is firmer than the upper column portion and the mattress structure adjacent the foot zone provides generally similar support and firmness characteristics as the mattress structure adjacent the head, shoulder, seat, and thigh zones while also reducing the interface pressure adjacent to the heels of the user.

11. The mattress core of claim 9, wherein one foam column of each of the head, shoulder, and thigh zones are made from foam having a selected first indention load deflection and one foam column of the seat section is made from foam having a selected second indention load deflection that is greater than the first indention load deflection so that the support and firmness characteristics of the mattress structure adjacent to the seat zone is greater than the support and firmness characteristics of the mattress structure adjacent to the head, shoulder, and thigh zones.

12. An elongated mattress core for a mattress structure, the mattress core comprising a foam core including an upwardly-facing top surface, a bottom surface spaced apart from the top surface, and first and second elongated sides connecting the top and bottom surfaces, the foam core being formed to include a plurality of longitudinally spaced apart transverse slits extending downwardly from the top surface, each slit terminating at a lower end spaced apart from the bottom surface by a first distance and each slit extending transversely from a first slit end spaced apart from the first side of the foam core to a second slit end spaced apart from the second side of the foam core, each adjacent pair of slits defining a foam column so that the foam core has a plurality of longitudinally spaced apart and transversely extending foam columns, each foam column having a pair of generally vertical column side walls defining the slits, the foam core being formed to include a plurality of slots, each slot being associated with a slit and extending generally vertically upwardly from the bottom surface to the lower end of its associated slit so that the slot cooperates with the slit to define an opening extending through the foam core from the top surface to the bottom surface, each slot extending transversely from a first slot end spaced apart from the first side of the core and a second slot end spaced apart from the second side of the core.

13. The mattress core of claim 12, wherein the distance between the first and second slit ends is greater than the distance between the first and second slot ends.

14. The mattress core of claim 12, wherein the first slot end is spaced apart from the first slit end and the second slot end is spaced apart from the second slit end.

15. The mattress core of claim 12, wherein a plurality of slots are associated with each slit.

16. The mattress core of claim 10, wherein the plurality of slots associated with each slit includes three slots.

17. The mattress core of claim 12, further comprising a low friction material received by one slit, the low friction material being formed to include a tab received by the slot so that the low friction material extends from the top surface of the foam core to the bottom surface of the foam core.

18. An elongated mattress core for a mattress structure, the mattress core comprising a foam core including an upwardly-facing top surface, a bottom surface spaced apart from the top surface, and first and second elongated sides connecting the top and bottom surfaces, the foam core being formed to include a plurality of longitudinally spaced apart transverse slits extending downwardly from the top surface, each slit terminating at a lower end spaced apart from the bottom surface by a first distance and extending transversely from a first slit end spaced apart from the first side of the foam core to a second slit end spaced apart from the second side of the foam core, each adjacent pair of slits defining a foam column so that the foam core has a plurality of longitudinally spaced apart and transversely extending foam columns, each foam column having a pair of generally vertical column side walls defining the slits, the foam core including longitudinally spaced apart head, shoulder, seat, thigh, and foot zones, each zone including at least one foam column, the foam columns of each zone being made from foam having a selected indention load deflection, the indention load deflection of the foam in each zone being selectable for each for each zone independently of the other zones, each of the foam columns being formed to include a second shallow slit extending downwardly from the top surface and terminating at a lower end of the shallow slit that is spaced apart from the bottom surface by a second distance and extending transversely from a first shallow slit end spaced apart from the first side of the core to a second shallow slit end spaced apart from the second side of the core, the second distance of each shallow slit within each zone being generally equal to the second distance of each other shallow slit within the zone, the second distance in one of the head, shoulder, seat, thigh, and feet zones being different from the second distance in another of the head, shoulder, seat, thigh, and feet zones.

19. An elongated mattress core for a mattress structure, the mattress core comprising a foam core including an upwardly-facing top surface, a bottom surface spaced apart from the top surface, and first and second elongated sides connecting the top and bottom surfaces, the foam core being formed to include a plurality of longitudinally spaced apart transverse slits extending downwardly from the top surface, each slit terminating at a lower end spaced apart from the bottom surface by a first distance and extending transversely from a first slit end spaced apart from the first side of the foam core to a second slit end spaced apart from the second side of the foam core, each adjacent pair of slits defining a foam column so that the foam core has a plurality of longitudinally spaced apart and transversely extending foam columns, each foam column having a pair of generally vertical column side walls defining the slits, the foam core including a frame including an elongated first foam side member having an inner side surface and an outer side surface spaced apart from the inner side surface and defining the first side of the foam core and an elongated second foam side member having an inner side surface and an outer side surface spaced apart from the inner side surface and defining the second side of the foam core, the slits extending transversely from the inner side surface of the first foam side member to the inner side surface of the second foam side member, each side member including an upper foam side member attached to at least one foam column of the plurality of foam columns and a lower foam side member positioned beneath the upper foam side member and attached to at least one foam column of the plurality of foam columns.

20. A mattress structure comprising a base including a perimetral rectangular base frame having a top surface and defining a central opening therein, and a foam bottom attached to the base frame and having a top surface spaced apart from and beneath a plane defined by the top surface of the frame to define a core-receiving space, and a foam core including a rectangular core frame having a bottom surface and defining a central opening therein and a plurality of transversely extending foam columns having bottoms and received in the central opening the foam core, the form core being carried by the base so that the bottom surface of the core frame engages the top surface of the base frame and the bottoms of the foam columns are received in the core-receiving space.

21. The mattress structure of claim 20, wherein the bottoms of the foam columns engage the top surface of the bottom of the base.

22. The mattress structure of claim 20, wherein the foam core is of unitary construction.

23. The mattress structure of claim 20, wherein each foam column includes two generally vertically extending side walls extending transversely between longitudinal sides of the core frame, the side walls having a shear coating having a low coefficient of friction to minimize the frictional engagement between adjacent foam columns so that each foam column can compress and decompress independently of the compression or decompression of each adjacent foam column.

24. The mattress structure of claim 23, wherein the shear coating includes a fabric material having a low coefficient of friction.

25. The mattress structure of claim 20, further comprising a mattress cover having a top and an interior region receiving the base, the foam core, and a shear layer made from a material having a low coefficient of friction and positioned to lie between the foam core and the top of the mattress cover so that the mattress cover can slide relative to the foam core.

26. The mattress structure of claim 25, wherein the mattress cover includes a top cover covering the foam core and a bottom cover covering the base and connected to the top cover by a zipper positioned along the perimeter of the base frame.

27. The mattress structure of claim 26, further comprising a storage cover cooperating with the top cover to define a storage space receiving the foam core, the storage cover connected to the top cover by a zipper positioned along the perimeter of the core frame.

28. A mattress structure comprising an elongated foam core of unitary construction including a top surface, a bottom surface, and a plurality of longitudinally spaced-apart and transversely-extending foam columns, each foam column having first and second longitudinally spaced-apart side walls, each pair of adjacent side walls of adjacent foam columns defining a slit so that the foam core includes a plurality of longitudinally spaced-apart slits, each pair of adjacent side walls further defining a slot beneath the slit and extending downwardly therefrom to the bottom surface, each slot and its respective slit cooperating to define an opening extending from the top surface to the bottom surface, and a shear panel including a first tab, a first side panel attached to the first tab, a top panel attached to the first side panel, a second side panel attached to the top panel, and a second tab attached to the second side panel, the shear panel being made from a material having a low coefficient of friction and being wrapped around one foam column of the plurality of foam columns so that the top panel engages the top surface, the first and second side panels engage the first and second side walls, the first tab is received by the slot defined by the first side wall and extends therethrough, and the second tab is received by the slot defined by the second side wall and extends therethrough.

29. The mattress structure of claim 28, wherein the first tab is attached to the second tab to hold the shear panel onto the foam column.

30. The mattress structure of claim 29, wherein an I-shaped connector penetrates both of the first and second tabs to attach the first tab to the second tab.

31. The mattress structure of claim 28, wherein the shear panel is a unitary elongated panel including a plurality of tabs, a plurality of side panels, and a plurality of top panels, each slot receiving a portion of the material having a low coefficient of friction so that each foam column is compressible and decompressible independently of each other foam column.

32. The mattress structure of claim 28, wherein three transversely spaced apart first tabs are attached to the first side panel of the shear panel and three transversely spaced apart second tabs are attached to the second side panel of the shear panel.

33. The mattress structure of claim 28, further comprising a mattress cover having a top, the mattress cover defining an interior region receiving the foam core and shear panel, and a shear layer made from a material having a low coefficient of friction positioned to lie between the top of the mattress cover and the shear panel so that the mattress cover can slide relative to the foam core.

34. The mattress structure of claim 28, wherein each foam column includes a top portion and a bottom portion beneath the top portion, the side walls of each foam column adjacent to the top portion define each respective slit, the side walls of each foam column adjacent to the bottom portion define each respective slot, and the bottom portion of each foam column is attached to the bottom portion of each adjacent foam column so that the foam core is unitary construction.

35. A mattress structure comprising:

a mattress core, a mattress cover having a top and a bottom and defining an interior region receiving the mattress core, the top and bottom of the mattress cover being separate pieces that couple together to define the interior region, and a shear layer made from a [material] *fabric* having a low coefficient of friction, the shear layer being positioned to lie between the mattress core and the top mattress cover so that the mattress cover can slide relative to the mattress core.

36. The mattress structure of claim 35, wherein the mattress core includes a rectangular foam frame defining a central opening therein and a plurality of foam columns received therein, and the shear layer encases the mattress core.

37. A mattress structure comprising:

a mattress core, a mattress cover having a top and a bottom and defining an interior region receiving the mattress core, and a shear layer made from a material having a low coefficient of friction, the shear layer being positioned to lie between the mattress core and the top of the mattress cover so that the mattress cover can slide relative to the mattress core, the mattress core having a top surface, a bottom surface vertically spaced apart from the top surface, and generally vertical sides connecting the perimeter of the top surface to the bottom surface, and the shear layer being a unitary member having a top panel engaging and covering the top surface of the foam core, downwardly extending sides appended to the top panel and engaging and covering the sides of the foam core, and a fitted portion engaging the bottom surface of the foam core.

38. A mattress structure consisting essentially of a cover having an interior region, and a plurality of foam columns located within the interior region of the cover, each foam column having opposite sidewalls configured to abut a sidewall of an adjacent column, each sidewall having a shear covering surface which has a low coefficient of friction to reduce frictional forces resulting from engagement of adjacent column sidewalls during compression and decompression of the columns.

39. A mattress structure consisting essentially of a cover having an interior region, and a plurality of foam columns located within the interior region of the cover, each foam column having opposite sidewalls configured to abut a sidewall of an adjacent column, each sidewall having a shear covering surface which has a low coefficient of friction to reduce frictional forces resulting from engagement of adjacent column sidewalls during compression and decompression of the columns, and a shear layer located between the plurality of columns and the cover.

*40. A mattress structure comprising:*

*a mattress core,*

*a mattress cover having a top and a bottom and defining an interior region receiving the mattress core, the top and bottom of the mattress cover being separate pieces that couple together to define the interior region, and*

*a shear layer made from a textile material having a low coefficient of friction, the shear layer being positioned to lie between the mattress core and the top mattress cover so that the mattress cover can slide relative to the mattress core.*

*41. The mattress structure of claim 40, wherein the mattress core includes a rectangular foam frame defining a central opening therein and a plurality of foam columns received therein, and the shear layer encases the mattress core.*

* * * * *